(12) United States Patent
Takahashi et al.

(10) Patent No.: US 6,337,550 B1
(45) Date of Patent: Jan. 8, 2002

(54) VEHICLE SUBMERGENCE DETECTION SENSOR

(75) Inventors: Akihiro Takahashi; Yoshinobu Kirino, both of Takanezawa-machi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/482,008

(22) Filed: Jan. 13, 2000

(30) Foreign Application Priority Data

Jan. 14, 1999 (JP) ............................................ 11-008152
Jan. 14, 1999 (JP) ............................................ 11-008154

(51) Int. Cl.$^7$ .............................. B60R 21/00; B60J 1/00
(52) U.S. Cl. ........................................ 318/483; 318/286
(58) Field of Search ................................ 318/280, 283, 318/286, 287, 291, 293, 466, 468, 483; 307/9.1, 10.1

(56) References Cited

U.S. PATENT DOCUMENTS

| | | | | |
|---|---|---|---|---|
| 5,925,997 A | * | 7/1999 | Yamaoka | 318/483 |
| 6,060,794 A | * | 5/2000 | Takagi et al. | 307/125 |
| 6,081,085 A | * | 6/2000 | Ohashi et al. | 318/283 |
| 6,201,363 B1 | * | 3/2001 | Miyazawa | 318/283 |

FOREIGN PATENT DOCUMENTS

| | | |
|---|---|---|
| JP | 61-41055 | 3/1986 |
| JP | 61-235247 | 10/1986 |
| JP | 7-35846 | 2/1995 |
| JP | 10-1005 | 1/1998 |
| JP | 10-292731 | 11/1998 |
| JP | 11-115480 | 4/1999 |
| JP | 11-194107 | 7/1999 |
| JP | 11-287068 | 10/1999 |
| JP | 2000-127877 | 5/2000 |

* cited by examiner

*Primary Examiner*—Bentsu Ro
(74) *Attorney, Agent, or Firm*—Arent Fox Kintner Plotkin & Kahn, PLLC (57) ABSTRACT

A submergence detection sensor installed in a vehicle, having a control circuit board mounted on the vehicle for controlling the operation of a power window which is opened/closed by an electric motor. A pair of pad-like electrodes are installed on the control circuit board which are electrically conductive upon entry of water to generate a leak current therebetween and a submergence detection circuit is connected to one of the electrodes to receive the leak current and to compare with a threshold value to discriminate whether the vehicle submerges into water. A slot is provided in a gap between the electrodes which penetrates the control circuit board such that water present at the gap is discharged from the control circuit board, thereby enabling to effect submergence detection when the vehicle, in fact, submerges in water, while without making false detections owing to water condensation on the control circuit board or migration occurring therein. Instead of the pad-like electrodes, the sensor may use bar-like ones whose resistance is different when submerged in water or not.

4 Claims, 12 Drawing Sheets

PRIOR ART

FIG.12
PRIOR ART

VEHICLE SUBMERGENCE DETECTION SENSOR

BACKGROUND OF THE INVENTION

1. Field of the Invention

This invention relates to a vehicle submergence detection sensor, particularly to a vehicle submergence detection sensor wherein submergence of a vehicle is detected when an electrical conductive state is established between a pair of opposed electrodes installed on a control circuit board in the vehicle which conducts due to water.

2. Description of the Related Art

When an automobile or any other vehicle accidentally falls into the sea, a river, lake or the like, the occupants are likely to have only a short time to escape because a vehicle ordinarily sinks rapidly (quickly becomes submerged).

Efforts have therefore been made to develop systems capable of detecting vehicle submergence by means of an onboard submergence detection sensor and of, upon detection of submergence, immediately implementing measures to avoid danger to the passengers. Japanese Laid-Open Patent Application No. Sho 61(1986)-235,247, for example, depicts a vehicle submergence prevention system that is equipped with a submergence detection sensor which responds to vehicle submergence by activating an air bag to prevent the vehicle from sinking.

The system described in this Publication adopts a configuration including a submergence sensor for detecting what portion of the vehicle has sunk into water, a gas generating means for generating gas in response to a signal from the submergence sensor, and an air bag inflated by gas from the gas generating means to produce buoyancy in the water. This vehicle submergence prevention system utilizes a float-type submergence detection sensor.

This float-type submergence detection sensor is, however, disadvantageous. One drawback is that it requires a complex structure. The sensor's principle of operation also causes a problem. Specifically, for detecting submergence, it requires a switch to be activated by a float buoyed up by water flowing into a sensor case. As the submergence detection therefore takes time, operations for avoiding danger may be delayed.

Figure 11:
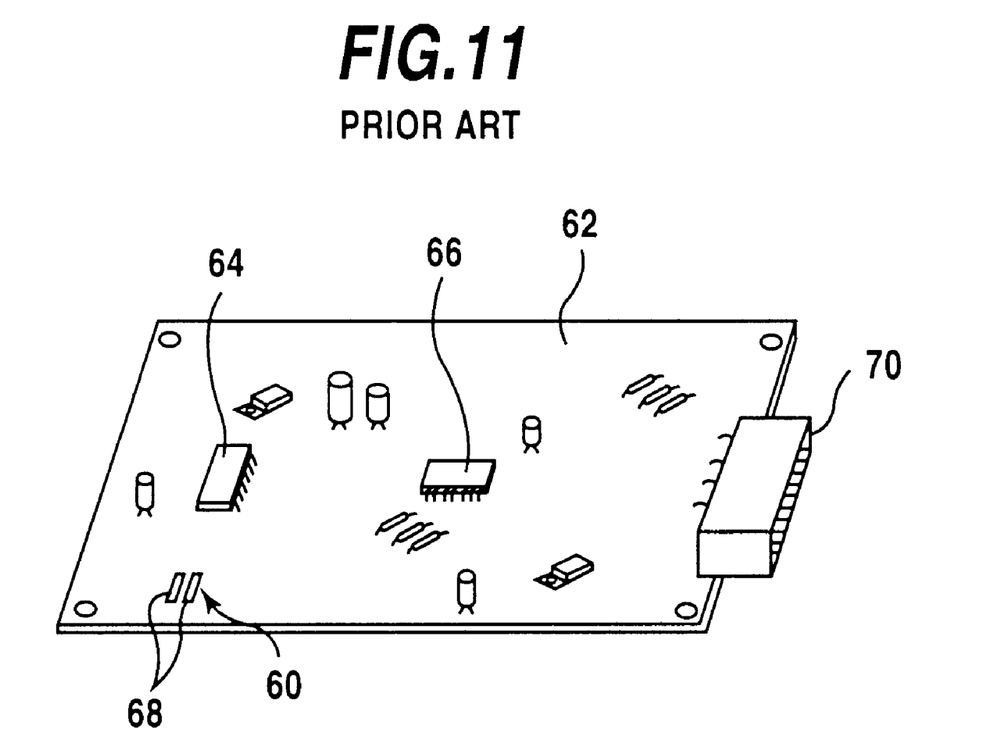
FIG. 11 is a perspective view showing the overall structure of a vehicle submergence detection sensor installed on a control circuit board according to prior art.

A system developed to overcome these problems provides a pair of pad-like electrodes for submergence detection on a control circuit board of a power window control unit that operates a power window (windows powered by electric motor for being opened or closed) in response to a leak in current occurring when the space between the two electrodes has become filled with water. The structure of the submergence detection sensor of this type will be explained with reference to FIGS. 11 and 12. FIG. 11 is a perspective view of the overall structure of the submergence detection sensor and FIG. 12 is a block diagram showing the circuit of the sensor.

As shown in FIG. 11, the submergence detection sensor assigned with reference number 60 is installed on a control circuit board 62 for the power window control unit. Similarly, multi-operation circuits 64, 66 and a connector 70 are installed on the control circuit board 62. The submergence detection sensor 60 includes a pair of pad-like electrodes 68 for submergence detection mounted on the control circuit board 62. The electrode pads 68 are made of a conductive material such as copper and are installed in an opposing relationship with a space therebetween. When the submergence detection sensor 60 detects vehicle submergence, it outputs a signal to a motor of a power window driver (not shown in FIG. 11) through the multi-operation circuits 64, 66 and the connector 70.

Figure 12:
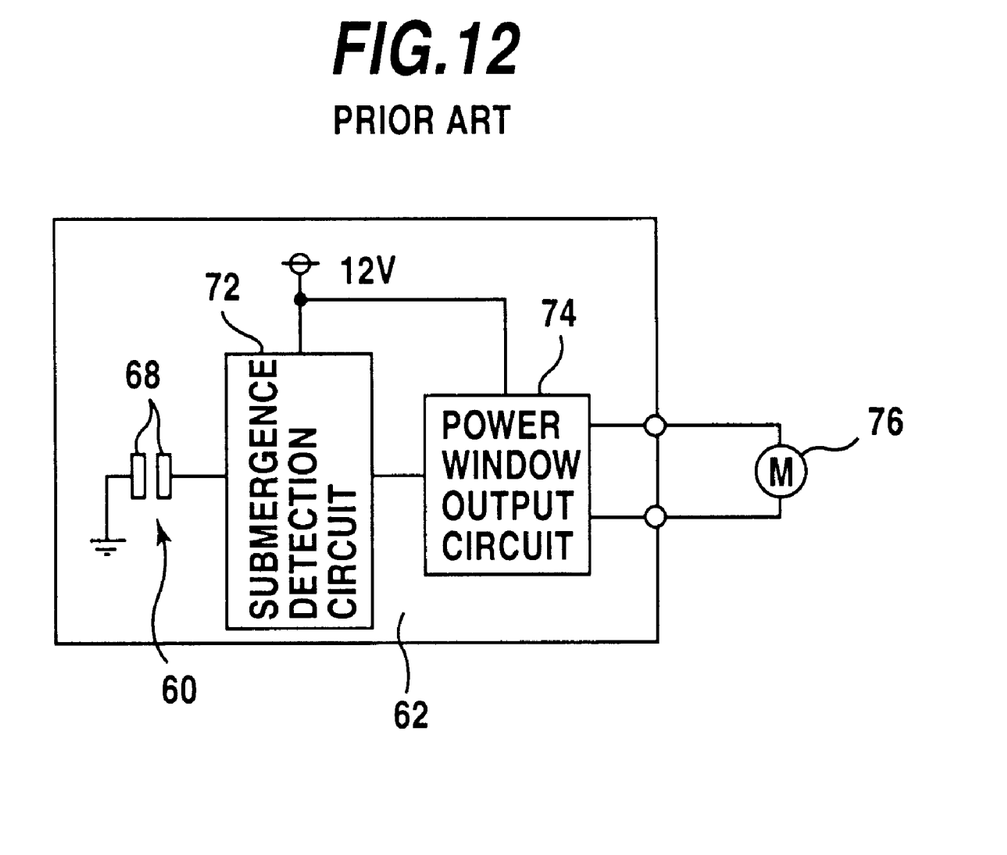
FIG. 12. is a block diagram showing a circuit of the vehicle submergence detection circuit sensor illustrated in FIG. 11.

More specifically, as shown in FIG. 12, one of the electrodes 68 is grounded and the other is connected to a submergence detection circuit 72 (whose operation is conducted by the multi-operation circuits 64, 66). The submergence detection circuit 72 is connected to a power window output circuit 74 (whose operation is similarly conducted by the multi-operation circuits 64, 66) to enable driving of the motor 76 of the power window.

When water (fresh water or seawater) enters between the electrodes 68, submergence of the vehicle is detected by the submergence detection sensor 60 owing to water establishing an electrically conductive state between the electrodes 68. A leak current therefore flows between the electrodes 68. Upon detecting the leak current, the submergence detection circuit 72 discriminates that the vehicle is in a submerged state and outputs the signal to the power window output circuit 74. In response, the power window output circuit 74 drives the motor 76 to control a danger avoidance operation, e.g., to open the power window.

The submergence detection sensor of this type which has pad-like electrodes for vehicle submergence detection on a control unit circuit board also has problems.

One is that water (dew) condensing between the electrodes owing to temperature difference relative to the outside air and/or high humidity also causes leak current to flow between the electrodes. This sensor is therefore susceptible to false detection, i.e., detection of submergence when the vehicle is not submerged.

Another is that the control unit circuit current promotes migration (intramolecular atom movement) of solder tin, which together with the action of water and the potential difference between the electrodes, produces electrocorrosion that dissolves out the electrode pad copper and establishes a conductive state between the electrodes. This is also a cause of false detection, i.e., detection of submergence when the vehicle is not submerged.

SUMMARY OF THE INVENTION

The object of the present invention is therefore to provide a vehicle submergence detection sensor, which while being of the type that detects vehicle submergence from the establishment of electrical conductivity between two electrodes placed in an opposing relationship on a control circuit board by entry of water therebetween, is capable of reliably detecting vehicle submergence, when in fact it submerges in water, without making false detections owing to water condensation on the control circuit board or migration occurring therein.

In accordance with a fist aspect of the present invention, there is provided a submergence detection sensor installed in a vehicle, comprising: a circuit board; a pair of electrodes installed on the circuit board which are electrically conductive upon entry of water to generate a leak current therebetween; a submergence detection circuit connected to the electrodes to receive the leak current and to compare with a threshold value to discriminate whether the vehicle submerges into water; and a slot provided in a gap between the electrodes which penetrates the circuit board such that water present at the gap is discharged from the circuit board.

In accordance with a second aspect of the present invention, there is provided a submergence detection sensor installed in a vehicle, comprising: a circuit board; a pair of electrodes installed on the circuit board which are electrically conductive upon entry of water to generate a leak current therebetween; and a submergence detection circuit connected to the electrodes to receive the leak current and to compare with a threshold value to discriminate whether the vehicle submerges into water; wherein: the electrodes are configured to be bar-like such that resistance is different for a case when they are submerged in water and when they are not submerged in water.

BRIEF EXPLANATION OF THE DRAWINGS

The foregoing objects and advantages of the invention will become more apparent from the following descriptions and drawings, in which.

DETAILED DESCRIPTION OF THE PREFERRED EMBODIMENTS

Embodiments of the present invention will now be explained with reference to the drawings.

Figure 1:
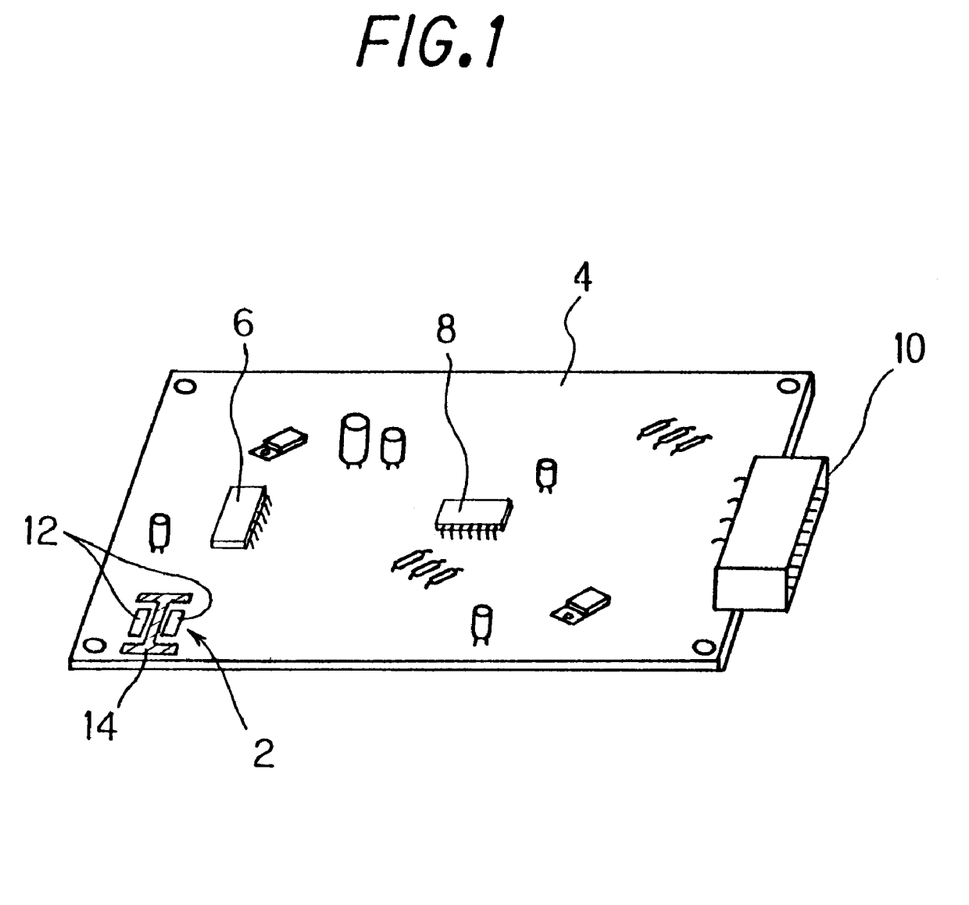
FIG. 1 is a perspective view showing the overall structure of a vehicle submergence detection sensor installed on a control circuit board according to an embodiment of the present invention.
Figure 2:
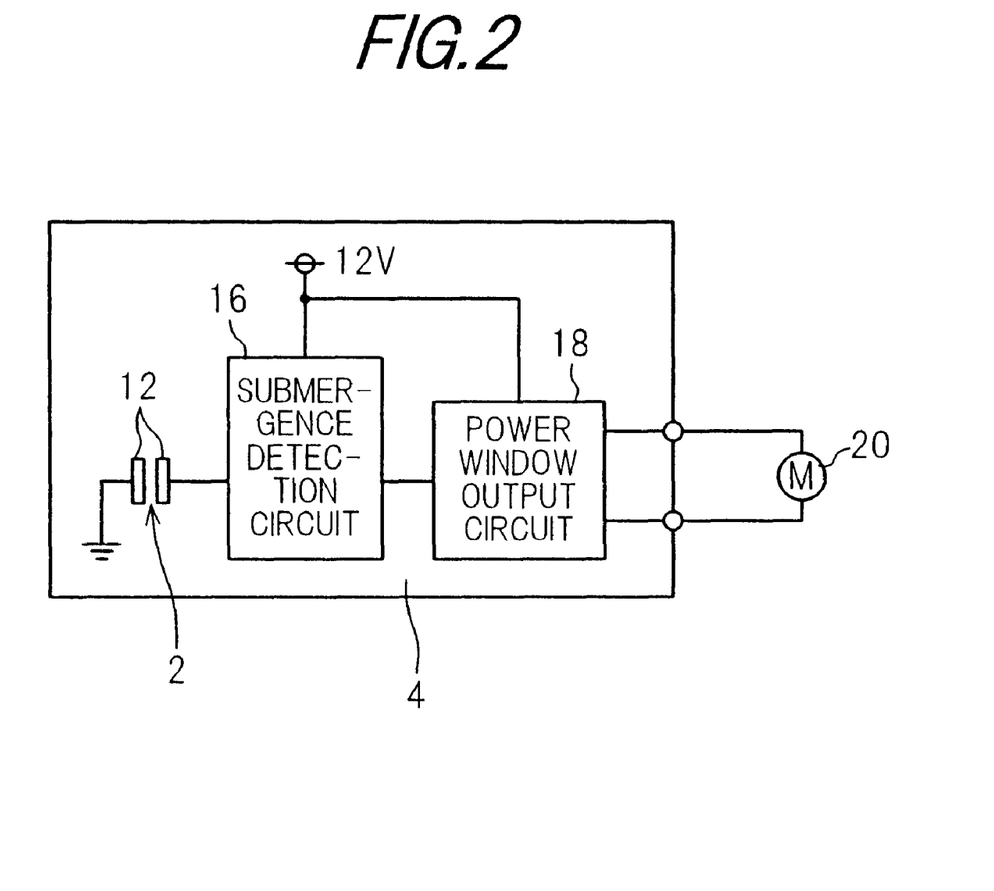
FIG. 2 is a block diagram showing a circuit of the vehicle submergence detection sensor illustrated in FIG. 1.
Figure 3:
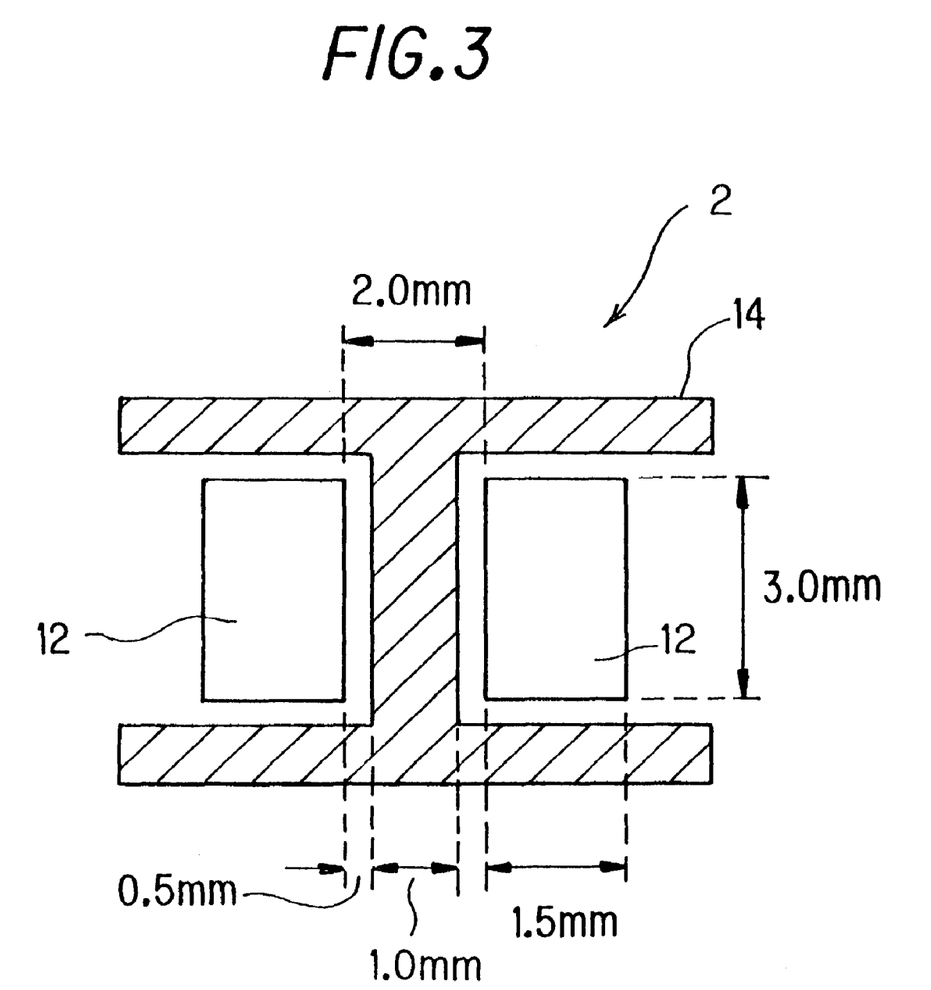
FIG. 3 is an enlarged partial top view of the control circuit board on which the vehicle submergence detection sensor illustrated in FIG. 1 is installed.

FIG. 1 is a perspective view showing the overall structure of a vehicle submergence detection sensor installed on a control circuit board according to an embodiment of the present invention, FIG. 2 is a block diagram showing a circuit of the vehicle submergence detection sensor illustrated in FIG. 1, and FIG. 3 is an enlarged partial top view of the control circuit board on which the vehicle submergence detection sensor illustrated in FIG. 1 is installed.

As shown in FIG. 1, the submergence detection sensor assigned with reference number 2 is installed on a control circuit board 4 for the power window control unit. Similarly, multi-operation circuits 6, 8 and a connector 10 are installed on the control circuit board 4. The submergence detection sensor 2 includes a pair of pad-like electrodes 12 for submergence detection mounted on the control circuit board 4. The electrode pads 12 are made of a conductive material such as copper and are installed in an opposing relationship with a space therebetween. When the submergence detection sensor 2 detects vehicle submergence, it outputs a signal to a motor of a power window driver (not shown in FIG. 1) through the multi-operation circuits 6, 8 and the connector 10.

More specifically, as shown in FIG. 2, one of the electrodes 12 is grounded and the other is connected to a submergence detection circuit 16 (whose operation is conducted by the multi-operation circuits 6, 8). The submergence detection circuit 16 is connected to a power window output circuit 18 (whose operation is similarly conducted by the multi-operation circuits 6, 8) to enable driving of the motor 20 of the power window.

Since the structure of an electric circuit for opening the power window when the vehicle is submerged is known from, for example, Japanese Utility Model Registration No. 3,043,616, no further explanation will be made.

As best shown in FIG. 3, the submergence detection sensor 2 includes a pair of pad-like electrodes 12 which are installed opposite to each other on the control circuit board 4. Typically, the pad-like electrodes 12 measure 1.5 mm×3.0 mm and are orientated with their longer edges (3.0 mm edges) facing each other at a spacing of around 2.0 mm. A first 1.0 mm-wide slot segment is formed to pass through the control circuit board 4 in the manner of a window between the electrodes 12 and similar slot segments are formed perpendicular to the first along the opposite ends of the electrodes 12. The three slot segments join to form an H-shaped slot 14 separated from the edges of the electrodes 12 by 0.5 mm.

Figure 4:
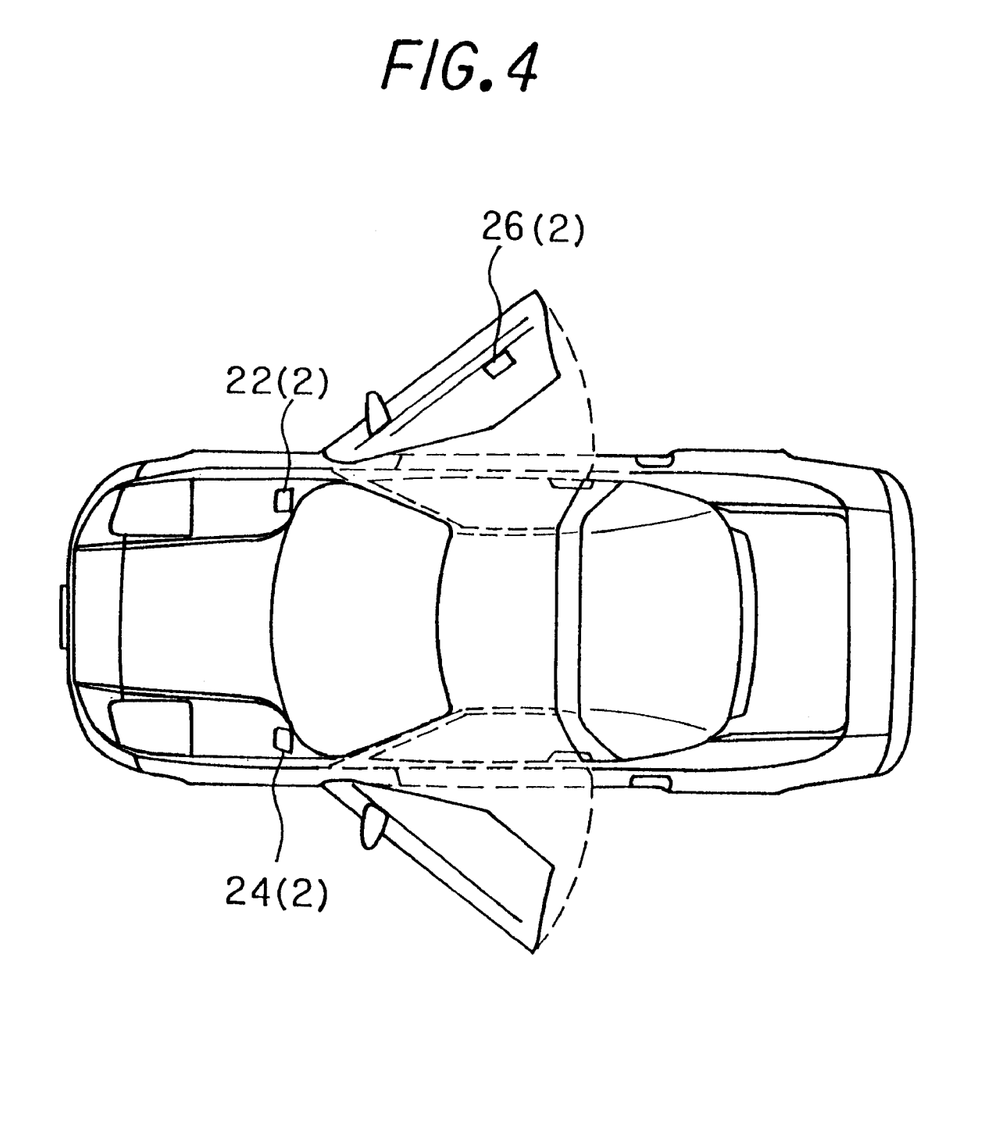
FIG. 4 is a top view showing a vehicle on which the vehicle submergence detection sensor illustrated in FIG. 1 and a driver control unit, etc. are mounted.

FIG. 4 is an explanatory top view of a vehicle (passenger car) to which the vehicle submergence detection system is to be installed. Such passenger cars are equipped with multiple control units, such as a driver control unit 22, an assistant control unit 24 and a door control unit 26, for controlling the operation of different vehicle equipment.

The driver control unit 22, for instance, is a control unit for controlling the vehicle window wipers, ignition key light, power window to the rear of the driver's seat, and the like. The assistant control unit 24 is a control unit for controlling the vehicle door locks, interior lights, power windows at and behind the front passenger's seat, and the like. The door control unit 26 is a control unit for controlling the vehicle retractable mirrors, driver's seat power window, and the like.

The vehicle submergence detection sensor 2 of the present invention is to be installed on the control circuit board 4, which is the control circuit board for control units 22, 24 and 26. With this, when the vehicle is detected to be submerged in water, it becomes possible to activate various danger avoidance operations such as opening the power window. Moreover, since the vehicle submergence detection sensor 2 is to be installed on the control circuit board for the assistant control unit 24, when the vehicle is detected to be submerged in water, it becomes also possible to release the door lock automatically.

Figure 5:
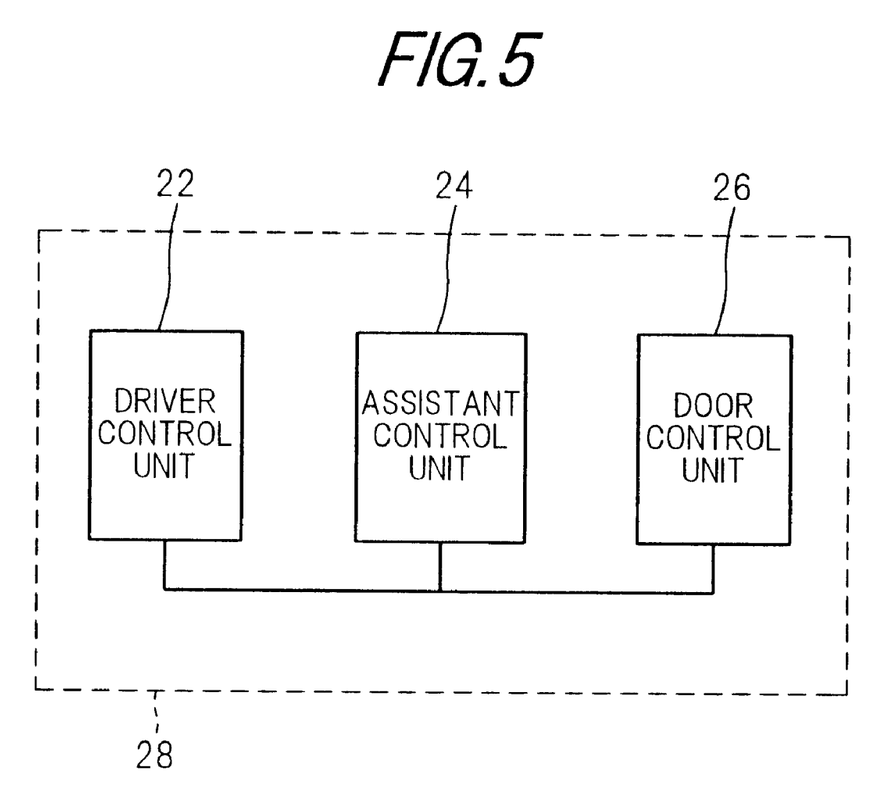
FIG. 5 is a block diagram showing a multiplex controller system enabling signal communication among different control units including the driver control unit illustrated in FIG. 4.

As shown in FIG. 5, the driver control unit 22, the assistant control unit 24 and the door control unit 26 are connected by a multiplex controller system (MPCS) 28 which enables signal communication among these control units. The first control unit to detect submergence can relay the detection signal to the other control units so that danger avoidance operations can be implemented immediately upon submergence of any of these portions of the vehicle.

To operate reliably, the vehicle submergence detection sensor 2 must be capable of immediately detecting vehicle submergence and implementing danger avoidance operations without delay. It is therefore preferably installed at the part of the vehicle which would enter the water first. In the case of a passenger vehicle, submergence starts from the engine compartment. The vehicle submergence detection sensor should therefore preferably be installed on a control unit in or near the engine (not shown) of the passenger vehicle.

In order for the submergence detection circuit 16 to discriminate vehicle submergence reliably, it must be set to operate when the leak current between the electrodes 12 is detected to have reached or exceeded a prescribed threshold value. If the prescribed threshold value is set to a very small value, the power window may operate to open when there is no need for it to open. If it is set too high, the power window may fail to operate to open even when the vehicle submerges. An appropriate threshold value must therefore be set. On the other hand, the circuit must be capable of operating for a predetermined time period such as at least 5 minutes after vehicle submergence. The threshold value must therefore be set taking into account adequate and stable detection. The determination of the threshold value of the leak current will be explained with reference to FIG. 6.

Figure 6:
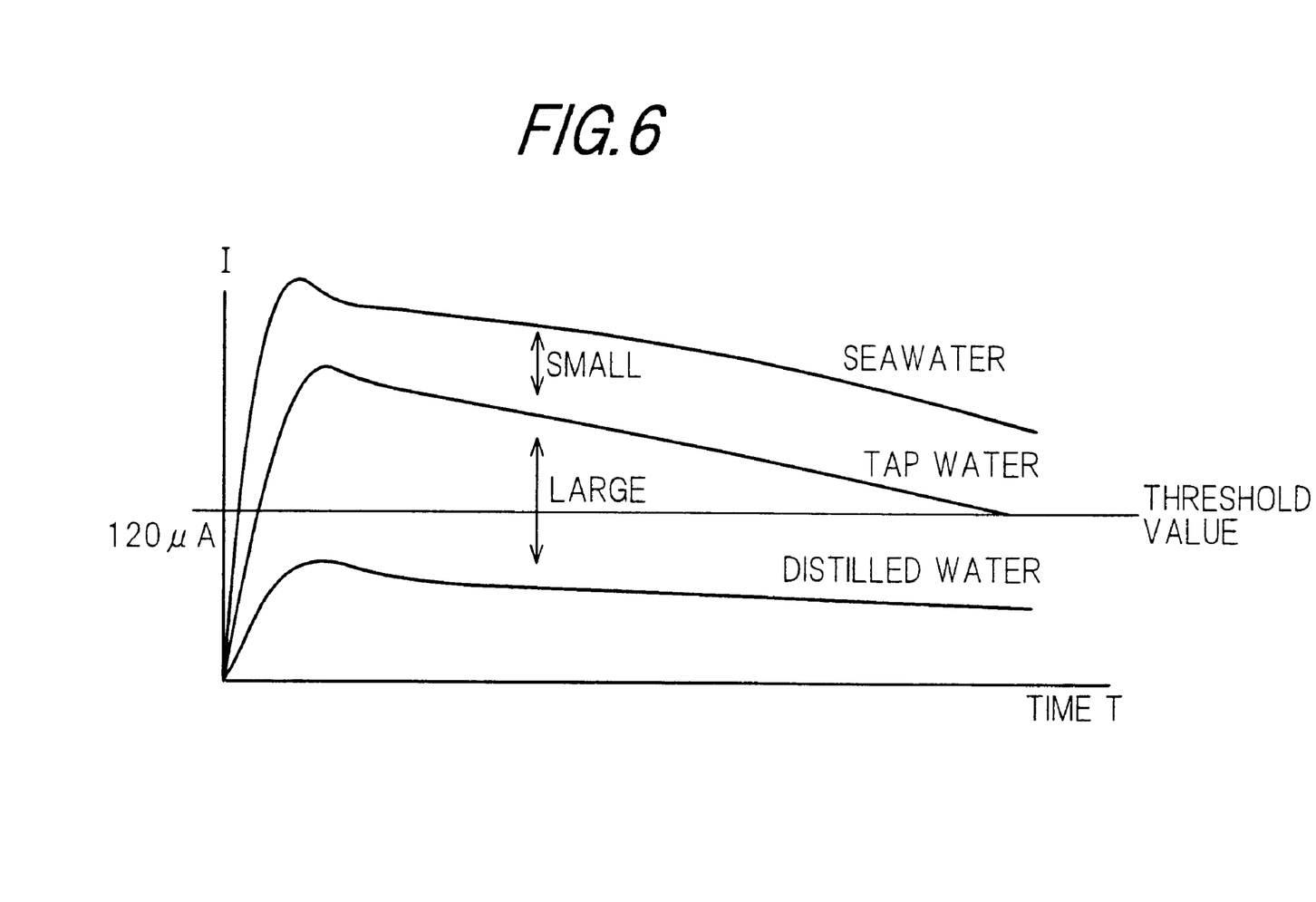
FIG. 6 is a graph showing experimentation data illustrating time-course change in leak current when a 12 V voltage source was connected across the electrodes of the submergence detection sensor illustrated in FIG. 1 after immersion in seawater, tap water and distilled water.

FIG. 6 is a graph showing experimentation data obtained by the inventors which illustrates time-course change in leak current when a potential of 12 V (the vehicle control voltage) was applied to the control circuit board 4 after immersion of the vehicle submergence detection sensor 2 installed on the board 4 in seawater, tap water and distilled water. The horizontal axis represents time and the vertical axis represents leak current. As shown, the magnitude of the leak current was greatest for seawater, followed by tap water and distilled water in that order. In all three cases, the leak current decreased gradually and the decrease became little with the passage of time.

The possibility of a vehicle submerging in distilled water is nil under normal circumstances. The threshold value of the leak current can therefore be set taking into account the need to detect leak current for the prescribed time period when the vehicle submerges in seawater or tap water (representing fresh water). Tt is set to 120 $\mu$A, for instance, in this embodiment.

Having been configured in the foregoing manner, in the vehicle submergence detection sensor 2 according to the first embodiment of the present invention, the window-like slot 14 provided between the pad-like electrodes 12 provides a passage for discharge of any water that may be present in the vicinity of the electrodes 12 owing to dew condensation caused by temperature difference relative to the outside air and/or high humidity or owing to intrusion of water from the outside. Therefore, water cannot reside between the electrodes 12 at times other than when the vehicle is submerged. Moreover, the slot 14 between the electrodes 12 can prevent electrical conduction between the electrodes 12 even if migration (intramolecular atom movement) should arise in the control circuit board 4.

On the other hand, when the vehicle, in fact, sinks into fresh water or sea water, the gap between the electrodes 12 of the submergence detection sensor 2 becomes filled with water. As the water establishes electrical conductivity between the electrodes 12, a leak current flows between them and is detected by the submergence detection circuit 16. Upon detecting the leak current, the submergence detection circuit 16 discriminates that the vehicle is in a submerged state and outputs a signal to the power window output circuit 18. Thus, since the control circuit board 4 is the one for the power window control units, in response, the power window output circuit 18 drives the motor 20 to control a prescribed operation, e.g., to open the power window. Danger avoidance can therefore be reliably implemented without risk of false detections caused by dew condensation on the circuit board or occurrence of migration therein.

Figure 7:
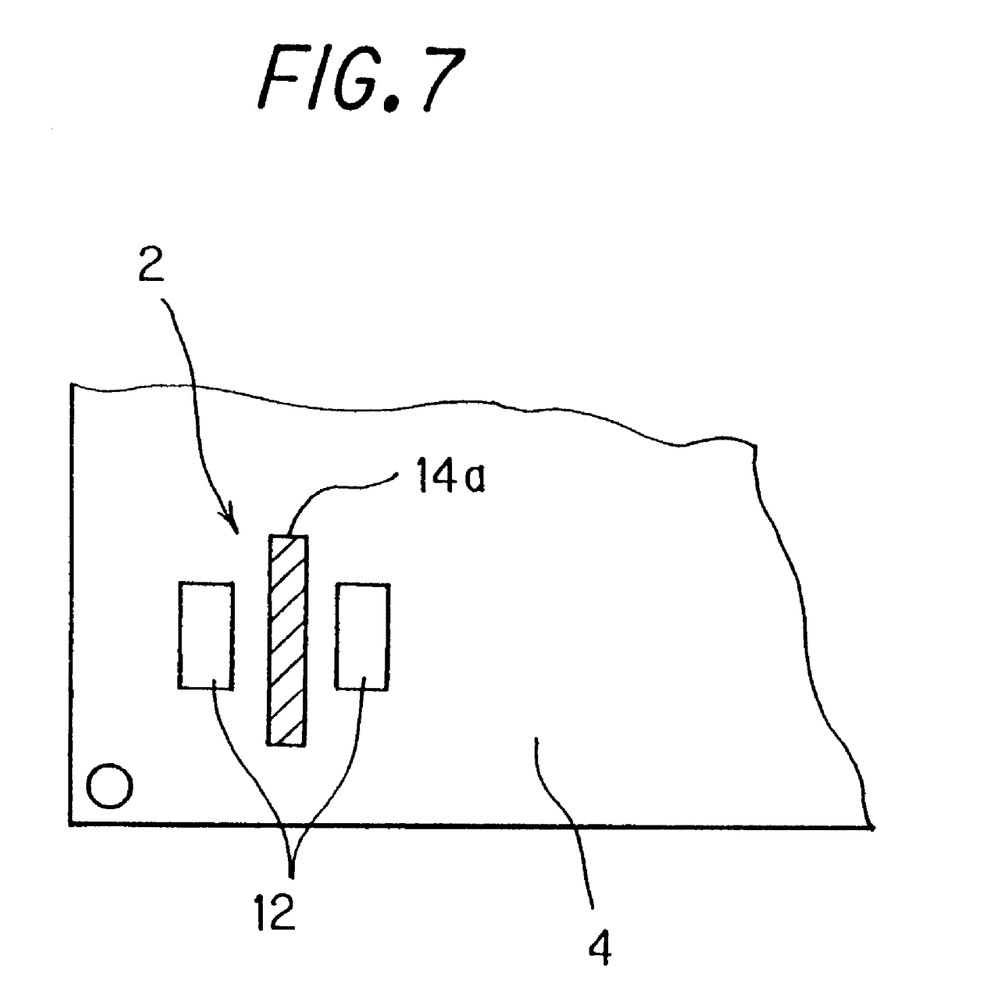
FIG. 7 is a view, similar to FIG. 3, but showing a vehicle submergence detection sensor installed on a control circuit board according to a second embodiment of the present invention.

FIG. 7 is a view, similar to FIG. 3, but showing the vehicle submergence detection sensor 2 according to a second embodiment of the present invention.

Although the first embodiment was described as utilizing the H-shaped slot 14, in the second embodiment, an I-shaped slot 14 has instead be used. The rest of the second embodiment is the same as that of the first embodiment.

With this, the I-shaped slot 14a between the pad-like electrodes 12 provides a passage for discharge of any water that may be present in the vicinity of the electrodes 12 owing to dew condensation caused by temperature difference relative to the outside air and/or high humidity or owing to intrusion of water from the outside. Therefore, water cannot reside between the electrodes 12 at times other than when the vehicle is submerged. Moreover, the slot 14a between the electrodes 12 can prevent electrical conduction between the electrodes 12 even if migration (intramolecular atom movement) should arise in the control circuit board 4. Danger avoidance can therefore be reliably implemented without risk of false detections caused by dew condensation on the circuit board or occurrence of migration therein.

Thus, the slot can be of any desired shape and, specifically, can be one consisting of a single straight slot passing between the electrodes 12.

Figure 8:
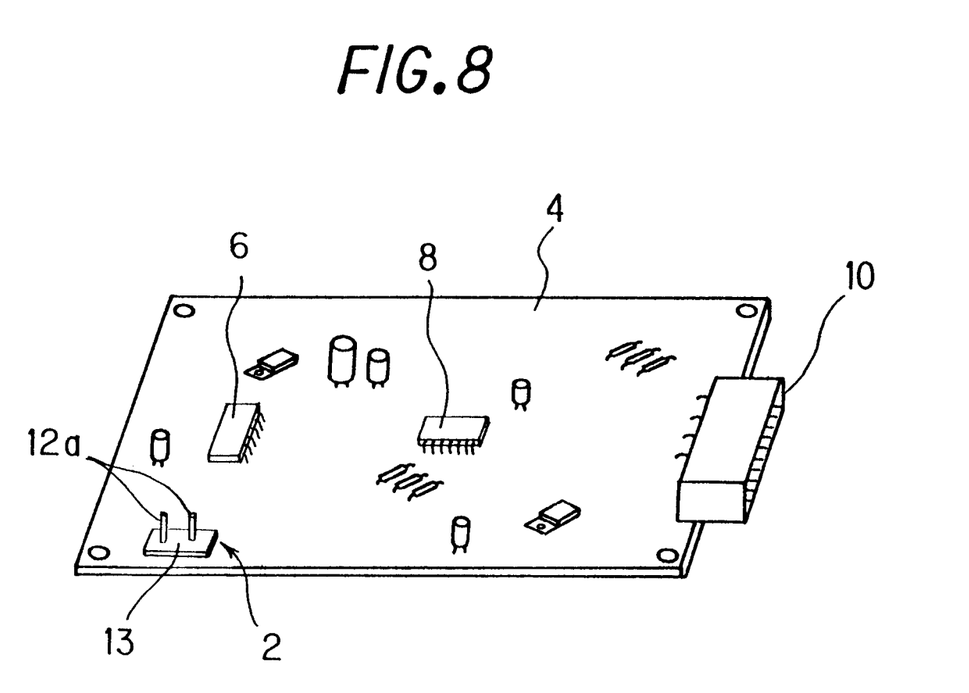
FIG. 8 is a view, similar to FIG. 1, but showing a vehicle submergence detection sensor according to a third embodiment of the present invention.

FIG. 8 is a view, similar to FIG. 1, but showing a vehicle submergence detection sensor according to a third embodiment of the present invention.

Explaining the third embodiment with the focus on the difference from the first embodiment, as shown in FIG. 8, the vehicle submergence detection sensor 2 in the third embodiment is configured to have bar-like electrodes 12a, made of a conductive material such as copper, which are installed opposite to each other with a space therebetween.

Figure 9:
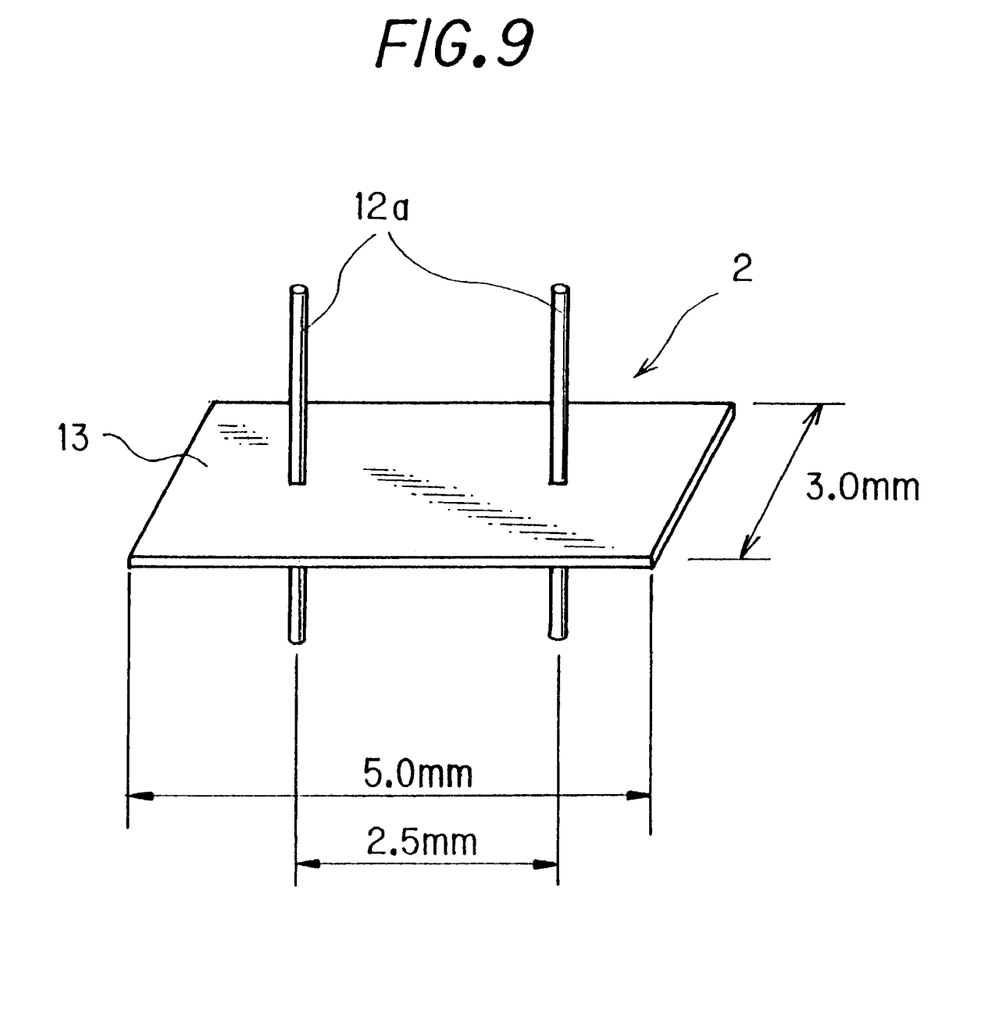
FIG. 9 is an enlarged perspective view showing bar-like electrodes used in the vehicle submergence detection sensor illustrated in FIG. 8.
Figure 10:
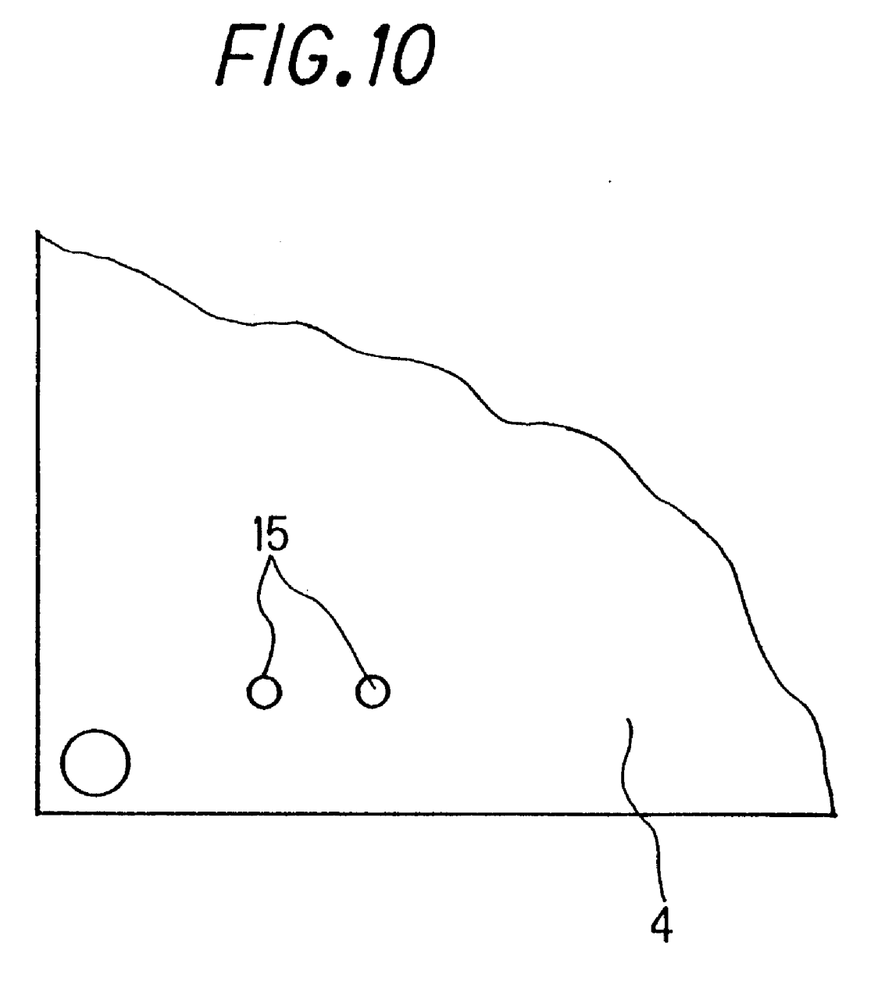
FIG. 10 is an enlarged partial top view of the control circuit board on which the submergence detection sensor illustrated in FIG. 8 is to be installed.

Specifically, as shown in FIG. 9, the electrodes 12a are fixed on a plate 13, made of an insulator material such as plastic and being of the size of 5.0 mm×3.0 mm, in such a way that the electrodes 12a are spaced apart by a gap of 2.5 mm. More specifically, as shown in FIG. 10, the control circuit board 4 is provided with two penetrating holes 15 in such a way that the electrodes 12a are inserted through the holes 15 such that the electrodes are fixed on the board 4 with the plate 13 soldered on the board 4. This facilitates manufacturing and assembling the submergence sensor 2.

In the vehicle submergence detection sensor 2 according to the third embodiment, since the electrodes 12a are configured to be bar like, the resistance between the bar-like electrodes 12a is great, for instance, 30 k$\Omega$ when not submerged in water. On the contrary, when the electrodes 12a are submerged in water, the resistance is smaller, such as 20 kΩ. The rest of the third embodiment is the same as that of the first embodiment.

With this arrangement, even when any water is present in the vicinity of the electrodes 12a owing to dew condensation caused by temperature difference relative to the outside air and/or high humidity or owing to intrusion of water from the outside, since the resistance at that state is relatively large, the electrodes do not conduct between each other, so no leak current flows therebetween. Similarly, the bar-like electrodes 12a with high resistance can prevent electrical conduction therebetween even if migration (intramolecular atom movement) should arise in the control circuit board 4. With this, the false detection can surely be prevented.

On the other hand, when the vehicle, in fact, sinks into fresh water or sea water, the electrodes 12a of the submergence detection sensor 2 submerge into water, causing the resistance to be smaller. With this, the water establishes electrical conductivity between the electrodes 12a, a leak current flows between them and is detected by the submergence detection circuit 16. Upon detecting the leak current, the submergence detection circuit 16 discriminates that the vehicle is in a submerged state and outputs a signal to the power window output circuit 18. In response, the power window output circuit 18 drives the motor 20 to control a prescribed operation, e.g., to open the power window. Danger avoidance can therefore be reliably implemented without risk of false detections caused by dew condensation on the circuit board or occurrence of migration therein.

The embodiments are configured to have a submergence detection sensor 2 installed at a vehicle, comprising: a circuit board, i.e., the control circuit board 4 mounted on the vehicle; a pair of electrodes 12, 12a installed on the (control) circuit board which are electrically conductive upon entry of water to generate a leak current therebetween; a submergence detection circuit 16 connected to the electrodes 12, more specifically one of the electrodes 12 to receive the leak current and to compare with a threshold value to discriminate whether the vehicle submerges into water; and a slot 14 provided in a gap between the electrodes which penetrates the (control) circuit board such that water present at the gap is discharged from the (control) circuit board.

In the system, the control circuit board 4 is one for a power window control unit for opening the power window through a motor 20.

In the system, the electrodes 12 are pad-like electrodes.

In the system, the slot 14 is H-shaped when viewed from above, or the slot 14a is I-shaped when viewed from above.

Moreover, the embodiments are configured to have a submergence detection sensor 2 installed in a vehicle, comprising: a circuit board, i.e., a control circuit board 4 mounted on the vehicle; a pair of electrodes 12a installed on the (control) circuit board 4 which are electrically conductive upon entry of water to generate a leak current therebetween; and a submergence detection circuit 16 connected to the electrodes, more specifically to one of the electrodes to receive the leak current and to compare with a threshold value to discriminate whether the vehicle submerges into water, wherein the electrodes have resistance which are made different for a case when they are emerged into water and when they are not emerged into water.

In the system, the electrodes 12a are bar-like electrodes.

In the system, the electrodes 12a are installed on the (control) circuit board with their bars being inserted through holes 15 which penetrate the (control) circuit board.

In the system, the electrodes 12a are installed on the (control) circuit board through an insulator plate 13.

In the system, the (control) circuit board 4 is one for a power window control unit for opening the power window through a motor 20.

It should be noted in the above explanation, although the foregoing embodiments relate to configurations in which the electrodes are made of copper. The electrodes can, however, be made of any electrically conductive material. They can, for example, be chip component pads. Moreover, the electrodes are not limited to either the specific dimensions or the rectangular shape referred to in the foregoing explanation.

It should also be noted that, although the vehicle submergence detection sensor is installed on the control circuit board for controlling the operation of the power window, the vehicle submergence detection sensor may be installed on other control circuit board, or may be installed alone separately from any kinds of control circuit board.

It should further be noted that the threshold value is not limited to the value of 120 μA of the foregoing embodiments but is appropriately set with consideration to the electrode size, the sensor design and the operating environment.

It should further be noted that, although the embodiments were explained with reference to the case of installing the vehicle submergence detection sensor in a passenger car, installation in various other vehicles, including buses, trucks and other large vehicles, is also possible.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A submergence detection sensor installed in a vehicle comprising:
   a circuit board having circuits on it surface;
   a pair of electrodes installed on the circuit board which are electrically conductive upon entry of water to generate a leak current therebetween; and
   a submergence detection circuit connected to the electrodes to receive the leak current and to compare with a threshold value to discriminate whether the vehicle submerges into water;
   wherein the electrodes are configured to be bar-like and to extend upwardly from the surface of the circuit board such that resistance is different for a case when they are submerged in water and when they are not submerged in water.

2. A sensor according to claim 1, wherein the electrodes are installed on the circuit board with their bars being inserted through holes which penetrate the circuit board.

3. A sensor according to claim 1, wherein the electrodes are installed on the circuit board through an insulator plate.

4. A sensor according to claim 1, wherein the circuit board is one for a power window control unit for opening the power window through a motor.

* * * * *